UNITED STATES PATENT OFFICE.

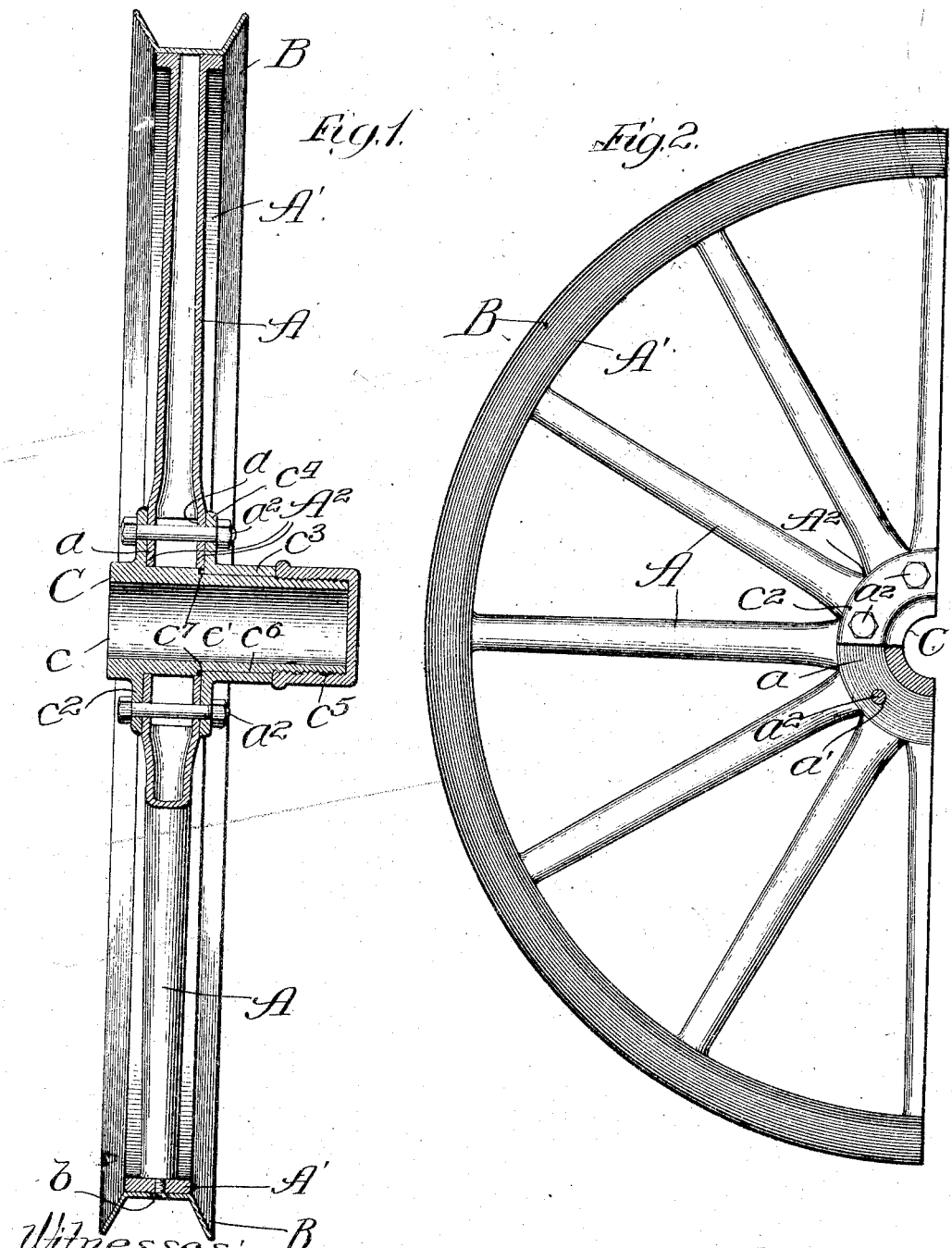

JACOB LAUTH, OF CHICAGO, ILLINOIS.

WHEEL.

No. 866,287.　　　Specification of Letters Patent.　　　Patented Sept. 17, 1907.

Application filed July 30, 1906. Serial No. 328,369.

*To all whom it may concern:*

Be it known that JACOB LAUTH, a citizen of the United States, residing at Chicago, in the county of Cook and State of Illinois, has invented a new and useful Improvement in Wheels, of which the following is a specification.

My invention relates particularly to improvements in metal wheels of the general character described in my Patent No. 744969, granted November 24, 1903.

My primary object is to provide a cast metal wheel which shall be free from danger of warping in the casting operation and which is capable of receiving interchangeable hubs and rims, thereby adapting the wheel to various forms of tires and various forms of bearings.

The invention is illustrated in its preferred embodiment in the accompanying drawing, in which—

Figure 1 is a sectional view of my improved wheel; and Fig. 2, a broken side elevational view of the same with a portion of the hub shown in section.

The wheel comprises, in the preferred construction; a series of spokes A; a rim $A^1$ formed integrally with the outer ends of the spokes; a ring $A^2$ formed integrally with the inner ends of the spokes; a removably connected tire-attaching rim B applied to the rim $A^1$; and a sectionally constructed hub C connected with the ring or hub portion $A^2$.

The spokes A are tubular and open at both ends, the bores of the spokes extending through the rim $A^1$. The rim is cylindrical in form with the metal extending transversely with relation to the spokes. The ring, or hub portion, $A^2$ is hollow, virtually affording two suitably spaced flanges $a$ lying in planes parallel with the plane of the spokes, at right angles to the axis of the wheel. The flanges $a$ are provided with perforations $a^1$ which serve to receive bolts $a^2$ which connect the flanges with the removable hub.

The rim B is connected with the rim $A^1$ by screws or rivets $b$.

The hub C may be of any suitable construction. As shown, it comprises a barrel $c$ having a bore $c^1$ and equipped near one end with an external flange $c^2$; a sleeve $c^3$ equipped with a flange $c^4$; and an end-cap $c^5$ threaded on to the extremity of the barrel $c$. The barrel $c$ extends through the ring $A^2$ and the flange $c^2$ bears against one of the flanges $a$ of said ring. The barrel has a reduced portion $c^6$ upon which the sleeve $c^3$ is fitted, and the flange $c^4$ bears against the other flange $a$ of the ring $A^2$. The bolts $a^2$ extend through all of said flanges, so that the ring $A^2$ is firmly clamped between the sections of the hub. The outer end of the barrel $c$ projects beyond the sleeve $c^3$ and is threaded to receive the end-cap $c^5$. The reduced section $c^6$ of the barrel is carried far enough to provide a pace $c^7$ which permits adjustment of the hub-sections and enables the ring $A^2$ to be firmly clamped.

It will now be understood that the spokes A, the rim $A^1$ and the ring $A^2$ may be integrally cast without danger of warping of the spokes, and that by means of interchangeable tire-attaching rims and hubs, the wheel is adapted to various forms of tires and various forms of bearings. In some instances the tire-attaching rim may be wholly omitted, and the rim $A^1$ may serve to receive the tire direct. The improved wheel is perfectly adapted for use in automobile construction, affording a strong, relatively light and indestructible wheel.

What I regard as new, and desire to secure by Letters Patent, is:

A wheel, comprising tubular spokes, a rim cast integrally with the outer ends of the spokes and having the metal disposed transversely with relation to the spokes, a ring cast integrally with the inner ends of the spokes and having flanges extending inwardly from the inner ends of the spokes, and a separately formed hub comprising sections having flanges embracing the flanges of said ring.

JACOB LAUTH.

In the presence of—
L. HEISLAR,
J. H. LANDES.